May 29, 1945. J. BELADA ET AL 2,377,294
ARTICLE TRANSFER MECHANISM
Filed April 23, 1943 3 Sheets-Sheet 3
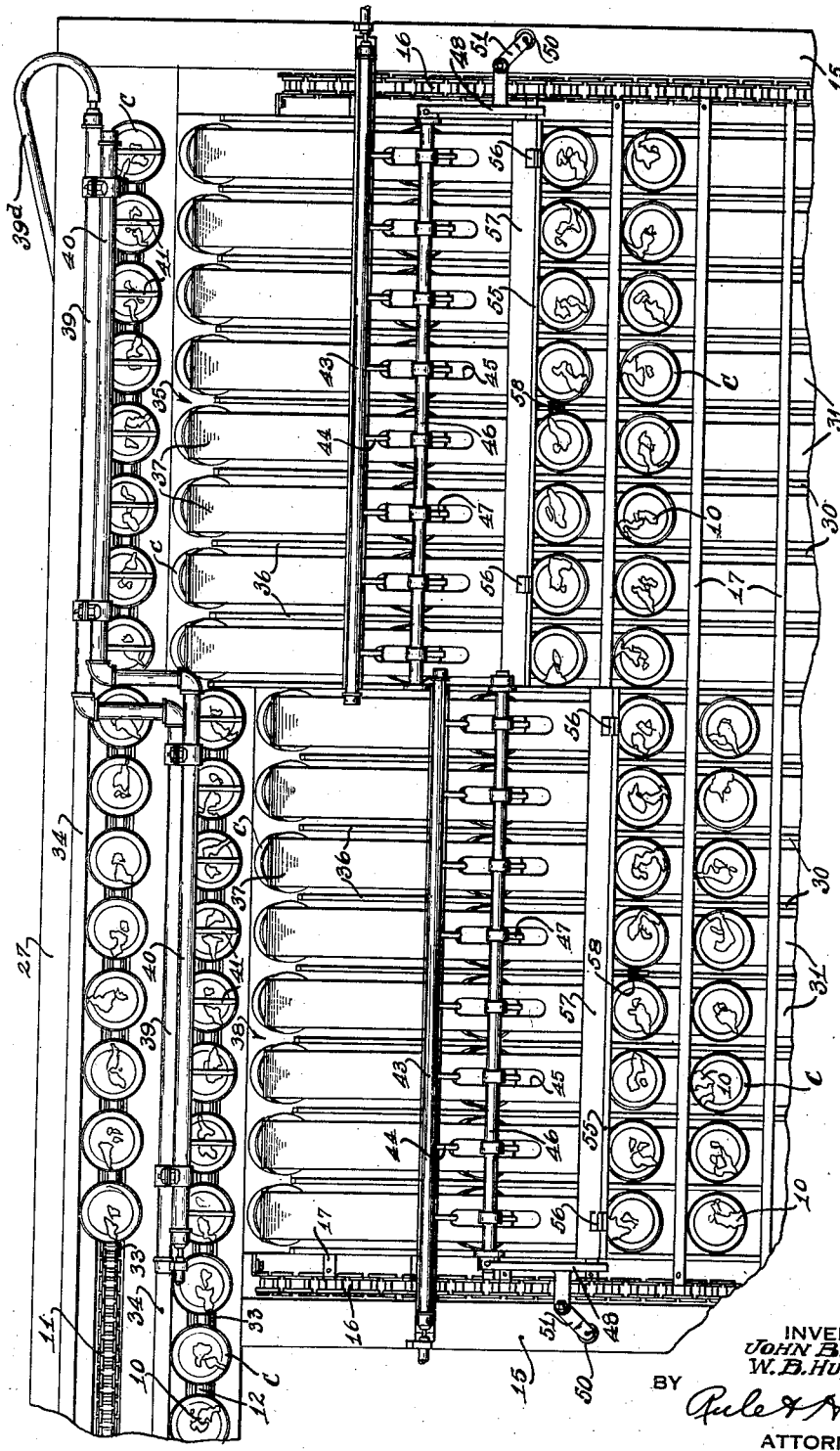
INVENTORS
JOHN BELADA
W. B. HULLHORST
BY
Rule & Hoge
ATTORNEYS Patented May 29, 1945

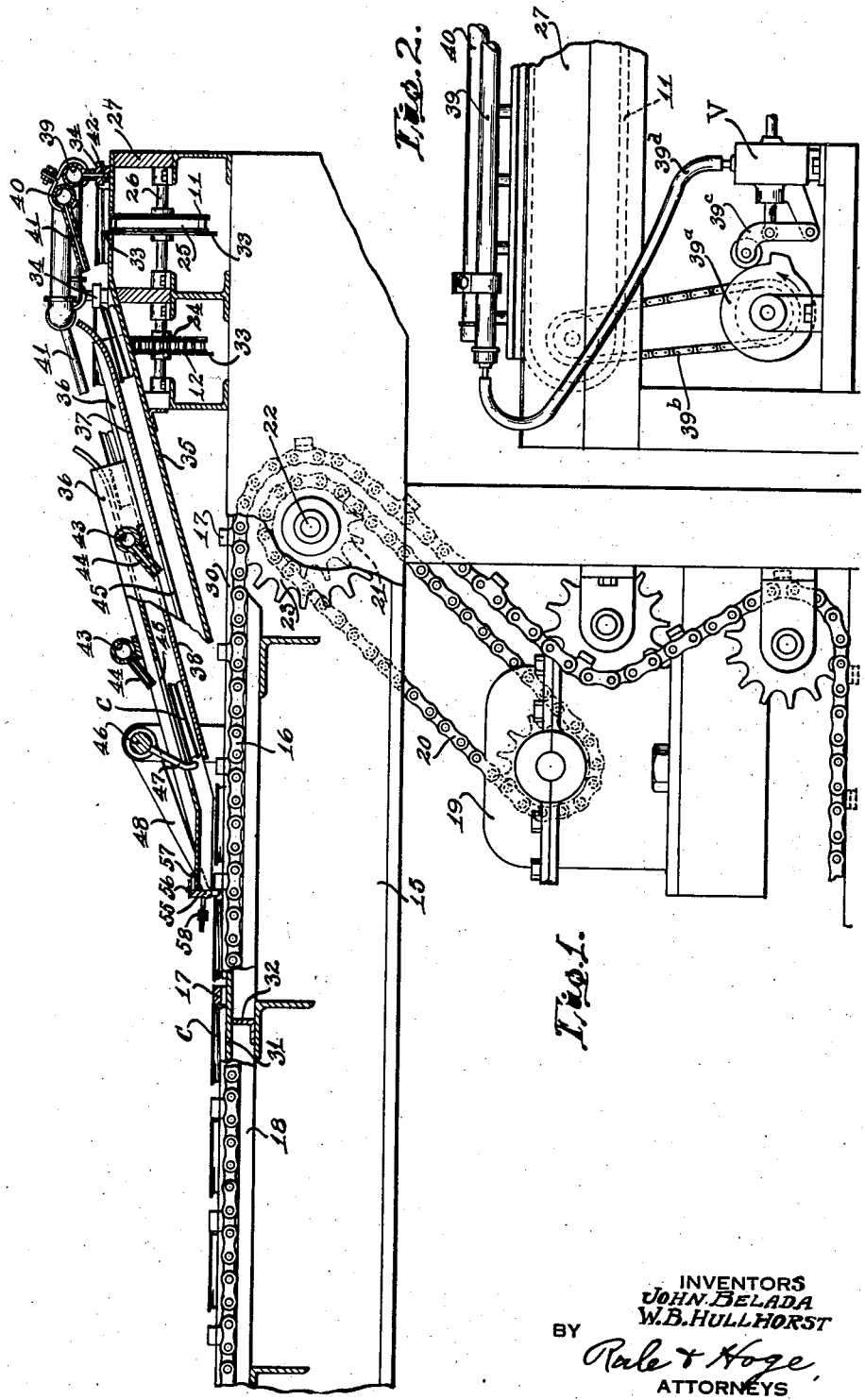

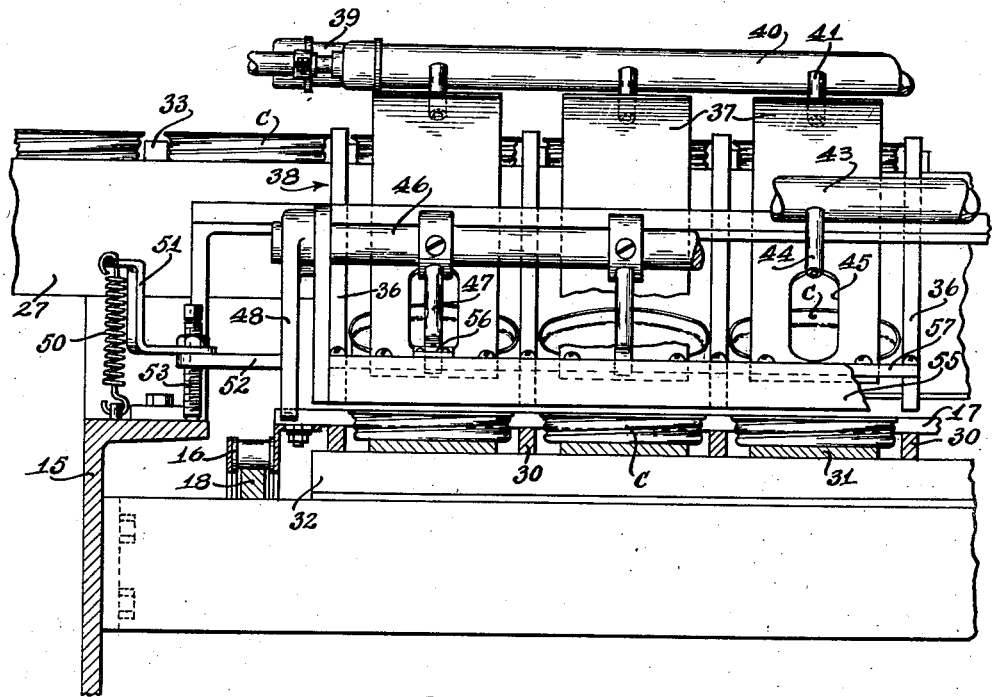

2,377,294

UNITED STATES PATENT OFFICE 2,377,294

ARTICLE TRANSFER MECHANISM

John Belada, Glassboro, N. J., and William B. Hullhorst, Toledo, Ohio, assignors to Owens-Illinois Glass Company, a corporation of Ohio Application April 23, 1943, Serial No. 484,154

11 Claims. (Cl. 302—11)

Our invention relates to apparatus for conveying articles and for transferring them from one conveyor to another. The invention in its preferred form comprises a continuously traveling conveyor or conveyors by which rows of articles are carried to a transfer position, and a conveyor traveling in a different direction, and transfer mechanism by which the articles are transferred in groups from one to another of said conveyors.

An object of the invention is to provide an apparatus adapted for conveying caps or closure devices to an oven or lehr and transferring them in groups to the lehr conveyor. Such apparatus may be used, for example, in transferring caps which have been supplied with a cap lining and sealing material such as wax or the like, to an oven or lehr by which such material is melted and distributed.

A further object of the invention is to provide a novel and practical form of pneumatic transfer mechanism by which articles may be transferred from one conveyor to another by means of air blasts.

Other objects of the invention will appear hereinafter.

Referring to the accompanying drawings:

Fig. 1 is a part-sectional elevation of an apparatus embodying our invention, parts of the apparatus being broken away.

Fig. 2 is a view showing the valve operating means controlling the air blasts.

Fig. 3 is a fragmentary cross-sectional elevation of the transfer mechanism.

Fig. 4 is a part-sectional elevation of the apparatus shown in Fig. 3 looking in a direction at right angles thereto.

Fig. 5 is a plan view of the apparatus.

The invention as herein illustrated is adapted for conveying and transferring caps or closure devices C, such as used for closing and sealing bottles and jars, which caps ordinarily are made of sheet metal. The caps are retained in an inverted position and each contains a small amount of wax or other sealing material 10 (Fig. 5). The caps are carried on horizontally traveling endless chain conveyors 11 and 12 to a transfer position at the front or intake end of an oven or lehr. The caps are then transferred in groups to the lehr conveyor which travels in a direction transverse to that of the conveyors 11 and 12 and are heated in the lehr to melt and distribute the lining material 10.

The lehr comprises a framework 15 which supports a lehr conveyor including endless sprocket chains 16 at opposite sides of the lehr. Driving bars 17 extend transversely of the lehr and are connected at their ends to the chains 16. The bars are spaced at regular intervals throughout the length of the chains and serve to carry the caps C through the lehr. The chains 16 are supported on rails 18. The lehr conveyor is driven continuously as by means of an electric motor which has driving connections through speed reduction gearing within a gear box 19, with a sprocket chain 20 trained over a sprocket wheel 21 on a conveyor drive shaft 22. The chains 16 are trained over driving sprocket wheels 23 keyed to the shaft 22.

The chain conveyors 11 and 12 are trained over sprocket wheels 24 and 25 (Fig. 1) mounted on shafts 26 journalled in a conveyor frame 27, the latter being supported on the lehr frame 15. The chain conveyors 11 and 12 are driven in synchronism with the lehr conveyor and preferably by the same motor, but at a higher speed as required to complete each row of caps transferred to the lehr conveyor. One such row is transferred from each chain conveyor to each driving bar 17, as indicated in Fig. 5, and as more fully described hereinafter.

The lehr is divided by means of spacing bars 30 extending lengthwise thereof, into a plurality of separate lanes. In the construction shown, there are sixteen of these lanes, eight of which receive caps from the conveyor 12 which extends halfway across the lehr. The chain conveyor 11 is extended to supply caps to the eight lanes positioned beyond the middle line of the lehr. The caps are supported on strips 31 as they advance through the lehr, said strips 31 being mounted on angle bars 32 forming part of the lehr framework.

The chain conveyors 11 and 12 are provided at intervals lengthwise thereof, with lugs 33 (Fig. 1) which project into position to contact the circumferential walls of the caps C and thus serve as a positive driving means for the caps. The spacing between the lugs 33 is the same as that of the guide rails 36, both being spaced at intervals somewhat greater than the diameters of the caps. Guide rails 34, individual to the lug chain conveyors 11 and 12, extend lengthwise thereof, for holding the caps in position on the conveyor chains. By reference to Fig. 1, it will be seen that the driving lugs 33 are positioned forwardly (with respect to the direction of transfer) beyond the center line of the caps so that the driving pressure of said lugs against the caps always tends to hold them in contact with the guide rail 34.

The caps are transferred from the lug chain conveyor 11 to the lehr conveyor through inclined chutes 35, comprising an inclined sheet metal bottom plate, the forward end of which is directly over the lehr conveyor, and spacing strips 36 which are in line with and may form extensions of the strips 30. Overlying the chutes 35 and spaced thereabove to permit the passage of the caps, are inclined top guide plates 37. Chutes 38, substantially similar in construction to the chutes 35, are arranged to receive the caps from the conveyor 12 and transfer them to the lehr conveyor.

The caps are transferred from the lug chain conveyors to the chutes 35, 38 by pneumatic pressure supplied by a series of air nozzles. The air is supplied through pipes 39 and 40 mounted on the frame 27 and extending lengthwise thereof. The pipe 40 is provided with nozzles 41, individual to the chutes 35, and each arranged to direct a stream of air against the caps as the latter move along said chutes. The pipe 39 is provided with short branch pipes through which air is supplied to nozzles 42 in the guide rail 34. These nozzles are in line with the chutes and are arranged to direct blasts of air against the caps for blowing them into the chutes.

Means for intermittently supplying air under pressure to the pipe 39 includes a valve V (Fig. 2) which is periodically actuated by a rotary cam 39ª. The cam is continuously driven from the lug chain conveyor 11 through driving connections including a sprocket chain or belt 39ᵇ. The cam operates through a lever 39ᶜ to open the valve momentarily and thereby admit air through a pipe 39ᵈ to the pipe 39. This causes a short blast of air to issue from each of the nozzles 42.

The opening of the valve is so timed that the full row of caps, as shown in Fig. 5, is positioned in line with the chutes 35 before each opening movement of the valve. When the valve is opened the air blasts through the nozzles 42 blow the caps into the chutes 35, in line with the nozzles 41. Continuous pressure is maintained in the pipe 40, so that continuous streams or jets of air issue from the nozzles 41 and insure the movement of the caps downward through the chute 35, the driving force of the air blasts being supplemented by the action of gravity.

Air pressure pipes 43 positioned over the chutes 35 and 38, are provided with inclined nozzles 44 positioned over slots 45 formed in the strips 37. The nozzles are arranged and adapted to direct continuous streams or jets of air through the slots 45 and thus apply pneumatic pressure behind the caps to facilitate the transfer of the caps from the chutes to the lehr conveyor. Continuous air pressure is maintained in the pipes 43.

Stop mechanism for arresting the caps at the lower ends of the chutes, includes rock shafts 46 positioned over the chutes and each provided with stop arms 47 which project downwardly through the slots 45 into the paths of the caps. Each rock shaft 46 has attached to its outer end a rock arm 48 which is downwardly and forwardly inclined, and at its free end is formed with a lug 49 (Fig. 3), which projects downward into the path of the bars 17.

The rock arm 48 is yieldingly held in its lowered position by a coil spring 50 connected through an angle bar 51 to a projection 52 formed on the rock arm. An adjustable stop screw 53 limits the downward movement of the rock arm. Each of the driving bars 17, as it comes in contact with the lug 49, swings the rock arm 48 and thereby swings the stop fingers 47 upwardly to release the caps, and allow the lowermost cap in each chute to be moved downward onto the lehr conveyor. The nozzles 44 (see Fig. 3) are arranged to blow air directly against the lowermost cap in each chute and thereby insure its forward movement onto the conveyor therebeneath. The operation of the fingers 47 is so timed with respect to the movement of the lehr conveyor, that each cap is positioned between two of the driving strips 17.

In order to move the caps into such position, if they are released to the conveyor slightly out of time with the movement of the driving bars 17, safety gates 55 are provided. Each gate consists of a horizontal bar extending transversely of the lehr and connected by hinges 56 to a supporting strip 57 mounted on the forward ends of the plates 37. The lower edge of the gate is just above the path of the bars 17 and the caps, when the latter are positioned therebetween. If a cap, when it is discharged from the inclined chute, rests on a bar 17, it is arrested and held by the gate 55 until it drops into position between the bars 17. A weight 58 is adjustably mounted on the gate for holding it in operative position and allowing it to swing free of the caps when any abnormal resistance is encountered.

The operation may be summarized as follows:

The caps C are brought by the continuously traveling lug chain conveyors 11 and 12 to a transfer position, a row of eight caps being brought by the conveyor 11 into line with the eight lanes comprised in the right-hand half of the lehr conveyor, Fig. 5. At the same time a like row of caps is carried by the conveyor 12 into transfer position at the end of the left-hand half of the lehr. As the rows of caps reach such transfer positions, the valve V (Fig. 2) is actuated by its cam so that the nozzles 42 (Fig. 1) direct blasts of air against the caps and blow them into the chutes 35 and 38. Continuous streams or jets of air from the nozzles 41, are directed against the caps as they enter the chutes and insure their continued movement until arrested by the stop fingers 47 at the lower ends of the chutes. Each set of stop fingers 47 is periodically lifted by the driving bars 17 to permit the foremost cap in each chute to be transferred to a position between two adjacent bars 17 and then carried by said bars forward into and through the lehr.

Modifications may be resorted to within the spirit and scope of our invention.

We claim:

1. The combination of a horizontally traveling conveyor, lugs on the conveyor projecting therefrom in position to engage articles supported on the conveyor, said lugs being spaced at regular intervals along the conveyor, means providing a row of lanes having article receiving ends positioned along and adjacent to the path of the conveyor and the articles thereon, said lanes being spaced to correspond with the spacing of said lugs, and pneumatic means for blowing the articles from the conveyor into said lanes.

2. The combination of a horizontally traveling endless chain forming a conveyor for articles placed thereon, lugs carried by said chain at one side thereof and projecting upwardly therefrom at intervals along the chain, a stationary guide rail extending lengthwise of the chain along and adjacent to the other side thereof, means providing a row of guideways having receiving ends positioned along and adjacent to the conveyor, the spacing between the center lines of adjoining guideways being equal to the spacing between adjoining lugs on the conveyor, and automatic means for transferring articles from the conveyor to said guideways.

3. The combination of a horizontally traveling endless chain forming a conveyor for articles placed thereon, lugs carried by said chain at one side thereof and projecting upwardly therefrom at intervals along the chain, a stationary guide rail extending lengthwise of the chain along and adjacent to the other side thereof, means providing a row of guideways having receiving ends positioned along and adjacent to the conveyor, the spacing between the center lines of adjoining guideways being equal to the spacing between adjoining lugs on the conveyor, blowing nozzles positioned in line with said guideways at the opposite side of the conveyor from said guideways, said nozzles being positioned and arranged to blow air against articles on the conveyor, and automatic means for supplying blasts of air through said nozzles and thereby blowing the articles from the conveyor into said guideways.

4. The combination of a horizontally traveling endless chain forming a conveyor for articles placed thereon, lugs carried by said chain at one side thereof and projecting upwardly therefrom at intervals along the chain, a stationary guide rail extending lengthwise of the chain along and adjacent to the other side thereof, means providing a row of guideways having receiving ends positioned along and adjacent to the conveyor, the spacing between the center lines of adjoining guideways being equal to the spacing between adjoining lugs on the conveyor, blowing nozzles positioned in line with said guideways at the opposite side of the conveyor from said guideways, said nozzles being positioned and arranged to blow air against articles on the conveyor, automatic means for supplying blasts of air through said nozzles and thereby blowing the articles from the conveyor into said guideways, and means for supplying continuous streams of air and directing them against the articles in said guideways.

5. The combination of a horizontally traveling conveyor comprising bars extending transversely of the direction of travel of the conveyor, an inclined chute positioned over the conveyor and arranged to discharge articles onto the conveyor between said bars, and a gate positioned over the conveyor out of the path of said bars and in position to engage articles resting on said bars, while clearing articles positioned between said bars, said gate being mounted to swing upwardly when excessive pressure is applied thereto by a said article advancing with the conveyor.

6. The combination of a horizontally traveling conveyor comprising bars extending transversely of the direction of travel of the conveyor, an inclined chute positioned over the conveyor and arranged to discharge articles onto the conveyor between said bars, a stop finger positioned to arrest articles in said chute, automatic means for periodically lifting the stop finger and transferring the articles from the chute to the conveyor, and a hinged safety gate positioned over the conveyor out of the path of said bars and in position to engage a said article when the latter is resting on one of said bars.

7. The combination of a plurality of lanes arranged side by side and comprising two groups, the ends of the lanes of each group being arranged in a row, with the ends of one group positioned forwardly of the ends of the other group, conveyors individual to said groups and extending along said rows and each terminating at the end of its said row, means for driving the conveyors in the same direction and thereby causing them to convey articles and position them opposite said ends of the lanes, and automatic means for transferring rows of the articles from said conveyor to said lanes.

8. The combination of a plurality of lanes arranged side by side and comprising two groups, the ends of the lanes of each group being arranged in a row, with the ends of one group positioned forwardly of the ends of the other group, conveyors individual to said groups and extending along said rows and each terminating at the end of its said row, means for driving the conveyors in the same direction and thereby causing them to convey articles and position them opposite said ends of the lanes, and means operable automatically to simultaneously transfer rows of said articles from said conveyors to the respective groups of lanes.

9. The combination of a plurality of lanes arranged side by side and comprising two groups, the ends of the lanes of each group being arranged in a row, with the ends of one group positioned forwardly of the ends of the other group, conveyors individual to said groups and extending along said rows and operable to convey articles and position them opposite said ends of the lanes, an air pressure pipe extending along said conveyors, nozzles connected to said pipe and positioned in line with said lanes for blowing articles from the conveyors into said lanes, and automatic means for periodically and intermittently supplying air under pressure to said pipe and thereby blowing rows of articles from the conveyors into said lanes.

10. The combination of a horizontally traveling conveyor, means for spacing articles carried thereon at predetermined regular intervals along the conveyor, means providing a row of lanes having article receiving ends positioned along and adjacent to the path of the conveyor and the articles thereon, said lanes being spaced to correspond with the said spacing of the articles on the conveyor, and pneumatic means for blowing the articles from the conveyor into said lanes.

11. The combination of a downwardly and forwardly inclined chute, means for positioning articles in register with the chute at the upper end thereof, a blowing nozzle in line with said chute in position to blow the said articles from said registered position into the chute, means for intermittently supplying air under pressure to said nozzle, and a nozzle positioned over said chute at a point intermediate the ends of the chute and inclined downwardly and forwardly relative to the chute, and means for supplying air continuously through said last mentioned nozzle.

JOHN BELADA.
WILLIAM B. HULLHORST.